Aug. 16, 1966  P. A. GOESER ETAL  3,266,738
MACHINE FOR THE PREPARATION OF PLASTICIZED MATERIAL
Filed June 25, 1964  2 Sheets-Sheet 1
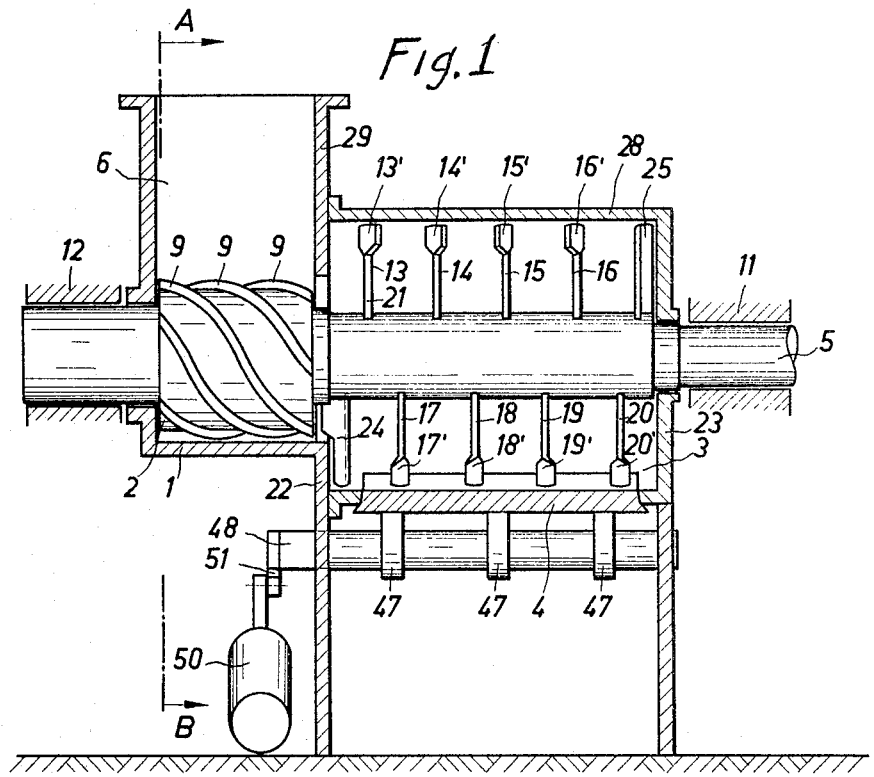
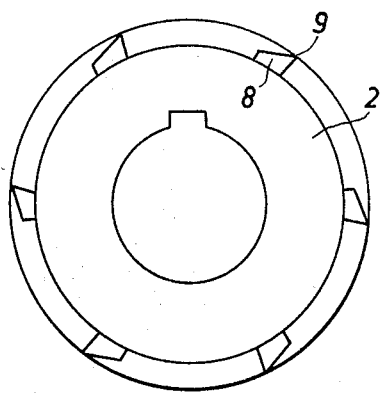
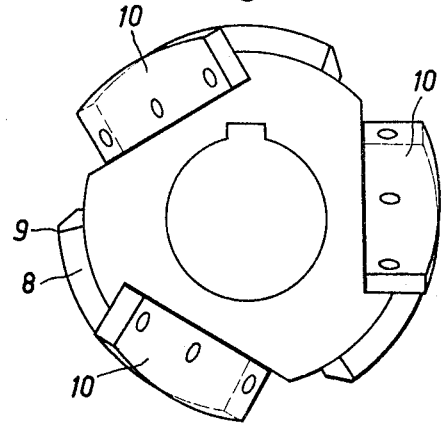
Inventors:
PAUL AUGUST GOESER
AND KASPAR ENGELS
BY Robert H Jacob
AGT.

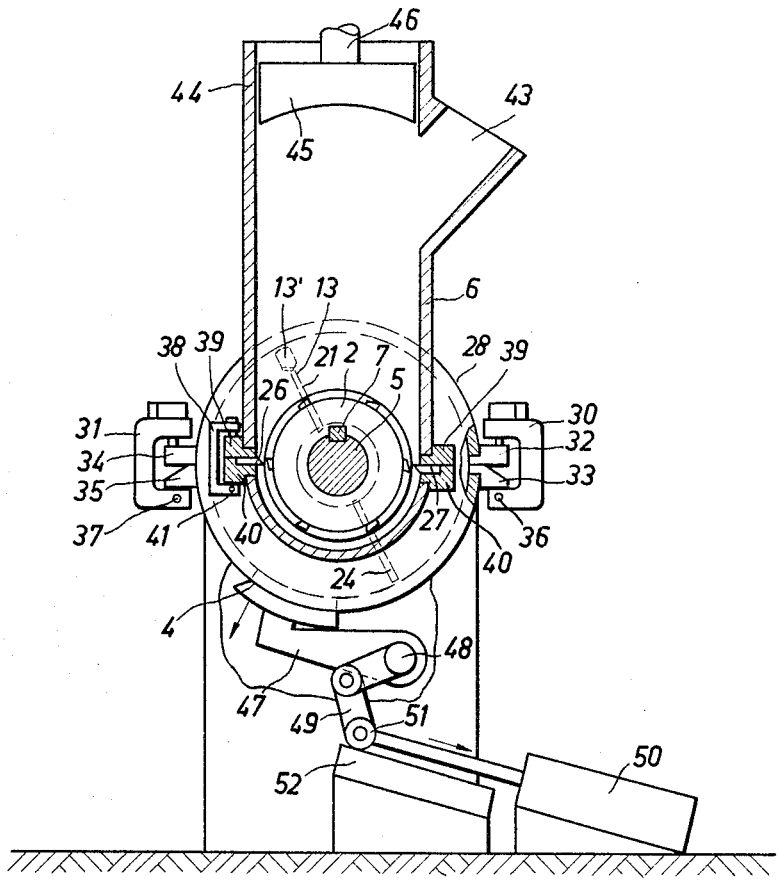

3,266,738
MACHINE FOR THE PREPARATION OF
PLASTICIZED MATERIAL
Paul August Goeser, Mannheim-Feudenheim, and Kaspar
Engels, Mannheim-Waldhof, Germany, assignors to
Draiswerke G.m.b.H., Mannheim-Waldhof, Germany
Filed June 25, 1964, Ser. No. 377,955
Claims priority, application Germany, Apr. 15, 1961,
D 35,854
7 Claims. (Cl. 241—98)

The present invention relates to machines for the preparation of plasticized material in a drum and more in particular for plasticizing waste or salvaged material preparatory for treatment in a calender, an extrusion press or the like. A machine for this purpose was already described in our copending application Serial No. 186,409, filed April 10, 1962, now abandoned, and the present application which is a continuation-in-part of that earlier disclosure illustrates and describes particular features of a practical embodiment of our invention more specifically and in greater detail.

Machines are known for the preparation of plasticized material which comprise a mixing drum that is provided with a rotatable mixing mechanism. The material supplied to this mixing drum is subjected solely to the frictional heat produced by the rotating mixing tools without the application of pressure. Under these conditions the ingredients for the plastic material can be converted to a flowable condition, to a jelled granular condition, or to a completely plasticized condition. In the latter condition the material is then fed to a calender or to an extrusion press or the like for further treatment. Heretofore these mixing machines were utilized for the said processes only in the working of the raw ingredients for thermoplastics or duroplastics, and for this purpose the machine has been found to be well adapted.

However, if the plastic material prepared by these machines is further treated in calenders, extrusion presses or the like, there results a certain amount of waste during this further treatment which consists, for example, of curled up strips from the lateral portion of the plastic foil produced or the like.

It is therefore an object of the present invention to re-use or salvage this waste of plastic material in an economical manner, and consequently the invention provides a mixing machine including a comminuting device for this waste foil or other plastic waste.

It is a further object of the invention to provide a machine in which waste foil or other salvaged material can be plasticized together with plastic raw material.

It is still a further object of the invention to provide a machine which makes it possible in one operation to comminute the waste material, feed it to the mixing drum and plasticize the material therein.

It is still another object of the invention to provide a machine which achieves the feeding of the waste together with the raw material and comminuting in a fraction of the relatively short time which the material spends in the drum.

Still a further object is to provide a plasticizing machine of the type contemplated in which the components are readily accessible and the interior of which can be easily cleaned.

Further objects and advantages of the invention will become apparent from the following description of a practical embodiment of a machine in accordance with the invention with reference to the accompanying drawings, in which FIG. 1 is a longitudinal sectional view of a machine in accordance with the invention, FIG. 2 is a cross-section of the comminuting means in the form of a feed and cutting worm, FIG. 3 is a sectional view of a different embodiment of a feed and cutting worm, and FIG. 4 is a cross-section of the machine taken along line A–B in FIG. 1.

The comminuting and plasticizing machine illustrated comprises essentially a cutting trough 1 having a cutting and feed worm 2, a mixing trough 3 with a mixing mechanism described hereinafter and a discharge flap 4 as well as a high speed driving motor (not illustrated) for connection by way of a coupling with the shaft 5 of the mixing mechanism and the cutting and feed worm 2. A supply funnel 6 is provided above the cutting trough 1.

The cutting and feed worm 2 is mounted on the common shaft 5 by means of a key 7 and is equipped with a plurality of worm segments 8, preferably six in number, which are provided with cutting edges 9.

In the modified embodiment of the cutting and feed worm shown in FIG. 3 additional linearly extending cutters 10 are provided besides the worm segments 8. The shaft 5 is journalled in roller or ball bearings 11 and 12 in a manner known per se.

Cutting and mixing tools 13, 14 15, 16, 17, 18, 19 and 20 are arranged upon the shaft 5 in the mixing trough 3, preferably in two linear rows which are displaced 180° relative to each other. These mixing tools are constituted by plane mixing arms 21 having mounted thereon shovels 13′, 14′, 15′, 16′, 17′, 18′, 19′ and 20′, which present sharpened forward edges. The cutting and mixing tools in one row 13, 14, 15, 16 are arranged in gaps with respect to the cutting and mixing tools 17, 18, 19 and 20 of the other row.

As seen in the direction of machine rotation, the arrangement of the shovels having the sharpened front edges is such that all cutting edges are directed toward that one of the end walls 22 or 23 of the mixing trough which is in closest proximity thereto. This means that in the embodiment in accordance with FIG. 1 the cutting edges of the shovels 13′, 14′, 17′ and 18′ are directed toward the left, and the cutting edges of shovels 15′, 16′, 19′ and 20′ are directed toward the right.

The diameter of the cutting and feed worm 2 may be smaller than or equal to the radius of the mixing trough or barrel 3.

Additional cutting and mixing tools 24, 25 are also provided proximate the end walls 22 and 23, respectively. These tools 24 and 25 are in the form of cutting blades having sharp front cutting edges extending over the entire length thereof. These cutting and mixing tools 24 and 25 lack the flat mixing arms 21, but instead the mixing shovel portions extend over the full length of the adjacent mixing trough wall up to the shaft 5.

As shown in FIG. 4 adjustable counter-cutters 26 and 27 are provided in a horizontal plane taken through the center of the mixing shaft 5 on both sides of the cutting and feeding worm 2.

Means are provided whereby the upper part 28, 29 of the mixing trough 3, respectively of the cutting trough 1 and feeding funnel 6 may be opened in a flat plane in the level of the mixing shaft 5. This makes it readily possible to draw off the cutting and feed worm from the shaft 5. Clamping jaws 30, 31 are provided for latching the parts of the mixing trough halves together, which jaws engage the projecting portions 32, 33 respectively 34, 35, which may be lugs or flanges. The clamping jaws are rotatable about axes 36, 37. The cutting trough 1 is similarly constructed. Here one clamping jaw 38 straddles the projections 39 and 40 between which the countercutter 26 is retained. This clamping jaw pivots about a shaft 41. The clamping jaws may be operated by hydraulic cylinders. FIG. 4 illustrates the clamping means for the cutting trough 1 merely on the left side of the trough. Similar means are provided in an analogous manner at the right side of the cutting trough.

Above the supply funnel 6 additional means may be provided comprising a trough portion 42 having an inclined filling aperture 43, while the vertical portion 44 is provided with a pressure plunger or piston 45 which is operable by means of a pusher rod 46.

The discharge flap 4 for the mixing trough or barrel 3 is mounted on a lever 47 for pivotal movement about a pivot pin 48 by way of a knee lever 49 which is operated by means of a hydraulic cylinder 50. The lever 49 is provided with a supporting roller 51 slidable on a supporting track 52.

It will be noted in FIG. 1 that the bearing 12 is not mounted directly on the end wall 22 of the mixing barrel 3 but is displaced to the left by a distance corresponding to the length of the cutting and feed worm 2. The pressure plunger or piston 45 shown in FIG. 4 pushes waste and fresh plastic material toward the feed and cutting worm 2 which is fed in through aperture 43.

The method of operation of a preparing and plasticizing machine in accordance with the invention is now briefly described. It is made possible by the invention to practice a method for the preparation of raw plastic materials and of waste materials which it was not possible to execute heretofore. It is conceivable to undertake the comminuting of the plastic waste materials in a separate operation with an independent comminuting machine. However, such separate comminuting treatment would not be possible at all because in comminuting the plastic materials the energy used for comminuting would already cause some plastification, which would make it necessary to provide special cooling means for the comminuting machine so that the feeding through a cutting mill would only be possible to a limited extent. Actually the plasticizing of the plastic waste materials would soon result in the soiling and clogging of the comminuting or chopping machine. On the other hand, it is an advantage of the preparing and plasticizing machine in accordance with the invention that the material enters the mixing trough or barrel 3 already in plasticized condition. Thus the cutting and feeding worm utilizes a part of the operating energy for working the plastic materials into plastic condition.

The machine is operated by batches with the working operation lasting approximately one minute. In order to obtain the plastification solely with the frictional heat of mixing without the use of additional pressure, a relatively large amount of driving power must be available. This driving power is available especially at the beginning of the working operation at the cutting and feed worm 2 so that the waste material can be drawn or pushed reliably into the mixing trough 3.

The material supplied through the funnel 6 is comminuted by the worm segments 9, partially plasticized and forced into the mixing trough 3. This phase of the operation must be performed during one-fourth to one-fifth of the total operating time. The arrangement of the cutting tools 13–20 in accordance with the invention, particularly the orientation of the cutting edges of the shovels or paddles explained above, results in that the material is moved in axial direction toward the center of the mixing trough 3. The arrangement of the cutting and mixing tools in series prevents the harmful formation of a roll of material around the shaft 5. The sharpened edges of the cutting paddles or shovels 13' to 20' serve particularly for transferring the kinetic energy of the shaft 5 onto the plastic material which accumulates in the form of a material ring or cylinder proximate the wall of the drum.

In the cutting trough 1 the cutting and the forcing of the cut material into the trough 3 and the softening and plastifying is effected by the heat that is developed. The cutters serve primarily for reducing the size of larger lumps of material.

When the material has attained its final plastic condition, the discharge flap 4 is swung downwardly by the cylinder 50 making it possible to rapidly remove the prepared plasticized material out of the mixing trough 3.

The invention is not limited to the embodiment described and illustrated herein, as other embodiments utilizing the inventive concept are feasible which are encompassed by the scope of the appended claims. It is also possible without departing from the scope of the invention to provide different dosing means for feeding predetermined quantities of material into the machine and, as the circumstances may require, control means may be provided which control the feeding speed of the feed plunger, the quantity of material to be supplied, the opening time of the discharge flap and others.

We claim:

1. Machine for the preparation of plasticized material for further treatment in a calender, an extrusion press or the like, said machine comprising, in combination, a housing including a mixing drum, a motor driven shaft extending through said housing operable at high velocity, a plurality of cutting and mixing tools arranged upon said shaft in at least two symmetrically displaced axial rows with the tools of one row disposed in gaps between the tools of the other row, each of said tools comprising an arm having a flat surface and a shovel disposed at the end of the arm at an angle relative to the axis of said shaft and having a sharp front edge, said tools being operable to form a ring of material around the walls of said drum which is subjected without application of pressure to the frictional heat of said mixing tools, and a cutting and feed worm for waste and fresh plastic material mounted on said shaft and having at least one cutting edge, and said cutting and feed worm having a diameter not exceeding the radius of said mixing drum.

2. Machine for the preparation of plasticized material for further treatment in a calender, an extrusion press or the like, said machine comprising, in combination, a housing including a mixing drum, a motor driven shaft extending through said housing operable at high velocity, a plurality of cutting and mixing tools arranged upon said shaft in at least two symmetrically displaced axial rows with the tools of one row disposed in gaps between the tools of the other row, each of said tools comprising an arm having a flat surface and a shovel disposed at the end of the arm at an angle relative to the axis of said shaft and having a sharp front edge, said tools being operable to form a ring of material around the walls of said drum which is subjected without application of pressure to the frictional heat of said mixing tools, and a cutting and feed worm for waste and fresh plastic material mounted on said shaft and having at least one cutting edge, said cutting and feed worm having a diameter not exceeding the radius of said mixing drum, and said shovels being disposed in a manner that in operation the cutting edges are directed toward the nearest end of said drum.

3. Machine for the preparation of plasticized material for further treatment in a calender, an extrusion press or the like, said machine comprising, in combination, a housing including a mixing drum, a motor driven shaft extending through said housing operable at high velocity, a plurality of cutting and mixing tools arranged upon said shaft in at least two symmetrically displaced axial rows with the tools of one row disposed in gaps between the tools of the other row, each of said tools comprising an arm having a flat surface and a shovel disposed at the end of the arm at an angle relative to the axis of said shaft and having a sharp front edge, said tools being operable to form a ring of material around the walls of said drum which is subjected without application of pressure to the frictional heat of said mixing tools, and a cutting and feed worm for waste and fresh plastic material mounted on said shaft and having at least one cutting edge, said cutting and feed worm having a diameter not exceeding the radius of said mixing drum, and said cutting and mixing tools proximate the end walls of said drum being in the form of shovels having a cutting edge extending over the entire length of the shovel.

4. Machine for the preparation of plasticized material for further treatment in a calender, an extrusion press or the like, said machine comprising, in combination, a housing including a mixing drum, a motor driven shaft extending through said housing operable at high velocity, a plurality of cutting and mixing tools arranged upon said shaft in at least two symmetrically displaced axial rows with the tools of one row disposed in gaps between the tools of the other row, each of said tools comprising an arm having a flat surface and a shovel disposed at the end of the arm at an angle relative to the axis of said shaft and having a sharp front edge, said tools being operable to form a ring of material around the walls of said drum which is subjected without application of pressure to the frictional heat of said mixing tools, and a cutting and feed worm for waste and fresh plastic material mounted on said shaft and having at least one cutting edge, and said cutting and feed worm having a diameter not exceeding the radius of said mixing drum and being provided with additional linearly extending cutters.

5. Machine for the preparation of plasticized material for further treatment in a calender, an extrusion press or the like, said machine comprising, in combination, a housing including a mixing drum, a motor driven shaft extending through said housing operable at high velocity, a plurality of cutting and mixing tools arranged upon said shaft in at least two symmetrically displaced axial rows with the tools of one row disposed in gaps between the tools of the other row, each of said tools comprising an arm having a flat surface and a shovel disposed at the end of the arm at an angle relative to the axis of said shaft and having a sharp front edge, said tools being operable to form a ring of material around the walls of said drum which is subjected without application of pressure to the frictional heat of said mixing tools, and a cutting and feed worm for waste and fresh plastic material mounted on said shaft and having at least one cutting edge, said cutting and feed worm having a diameter not exceeding the radius of said mixing drum, and a pair of adjustable counter-cutters being disposed proximate said cutting and feed worm in a plane extending horizontally through said worm and said shaft.

6. Machine for the preparation of plasticized material for further treatment in a calender, an extrusion press or the like, said machine comprising, in combination, a housing including a mixing drum, a motor driven shaft extending through said housing operable at high velocity, a plurality of cutting and mixing tools arranged upon said shaft in at least two symmetrically displaced axial rows with the tools of one row disposed in gaps between the tools of the other row, each of said tools comprising an arm having a flat surface and a shovel disposed at the end of the arm at an angle relative to the axis of said shaft and having a sharp front edge, said tools being operable to form a ring of material around the walls of said drum which is subjected without application of pressure to the frictional heat of said mixing tools, and a cutting and feed worm for waste and fresh plastic material mounted on said shaft and having at least one cutting edge, and said cutting and feed worm having a diameter not exceeding the radius of said mixing drum, said housing being divided into an upper and a lower portion along a horizontal plane extending through said shaft and said upper portion being movable relative to said lower portion and said cutting and feed worm being slidably and removably mounted on said shaft.

7. Machine for the preparation of plasticized material for further treatment in a calender, an extrusion press or the like, said machine comprising, in combination, a housing including a mixing drum, a motor driven shaft extending through said housing operable at high velocity, a plurality of cutting and mixing tools arranged upon said shaft in at least two symmetrically displaced axial rows with the tools of one row disposed in gaps between the tools of the other row, each of said tools comprising an arm having a flat surface and a shovel disposed at the end of the arm at an angle relative to the axis of said shaft and having a sharp front edge, said tools being operable to form a ring of material around the walls of said drum which is subjected without application of pressure to the frictional heat of said mixing tools, and a cutting and feed worm for waste and fresh plastic material mounted on said shaft and having at least one cutting edge, and said cutting and feed worm having a diameter not exceeding the radius of said mixing drum, said housing defining a supply funnel above said cutting and feed worm having an inclined filling aperture and a pressure piston being disposed in said funnel.

References Cited by the Examiner

UNITED STATES PATENTS

| | | | |
|---|---|---|---|
| 1,732,281 | 10/1929 | Robinson | 18—55 X |
| 2,681,769 | 6/1954 | Simenson | 241—101 |
| 2,722,163 | 11/1955 | Cumpston | 241—186 |
| 3,011,220 | 12/1961 | Keller | 241—154 X |
| 3,059,862 | 10/1962 | Rich | 241—152 |
| 3,076,610 | 2/1963 | Rosenfeld | 241—188 X |
| 3,215,355 | 11/1965 | Shouvlin | 241—101 X |

ROBERT C. RIORDON, *Primary Examiner.*

H. F. PEPPER, *Assistant Examiner.*